US012650743B2

(12) United States Patent
Zhou et al.

(10) Patent No.: US 12,650,743 B2
(45) Date of Patent: Jun. 9, 2026

(54) CIRCUIT BOARD, DISPLAY PANEL AND ELECTRONIC DEVICE

(71) Applicants:Chengdu BOE Optoelectronics Technology Co., Ltd., Chengdu (CN); BOE Technology Group Co., Ltd., Beijing (CN)

(72) Inventors: Peng Zhou, Beijing (CN); Qing Gong, Beijing (CN); Xu Lu, Beijing (CN); Yang Yue, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/861,525

(22) PCT Filed: Jan. 17, 2024

(86) PCT No.: PCT/CN2024/072684
§ 371 (c)(1),
(2) Date: Oct. 29, 2024

(87) PCT Pub. No.: WO2024/160050
PCT Pub. Date: Aug. 8, 2024

(65) Prior Publication Data
US 2025/0341907 A1      Nov. 6, 2025

(30) Foreign Application Priority Data
Feb. 3, 2023     (CN) .......................... 202310118518.4

(51) Int. Cl.
*G06F 3/041*          (2006.01)

(52) U.S. Cl.
CPC ................................. *G06F 3/0412* (2013.01)

(58) Field of Classification Search
CPC ...................................................... G06F 3/0412
See application file for complete search history.

(56) References Cited

U.S. PATENT DOCUMENTS

2021/0212207 A1*   7/2021  Xiong ..................... G06F 3/044

FOREIGN PATENT DOCUMENTS

| CN | 106775124 A | 5/2017 |
| CN | 105657967 B | 5/2019 |

(Continued)

OTHER PUBLICATIONS

PCT/CN2024/072684 international search report and Written Opinion dated Apr. 10, 2024.
CN202310118518.4 second office action dated Dec. 4, 2025.

*Primary Examiner* — Robin J Mishler
(74) *Attorney, Agent, or Firm* — IPro, PLLC

(57) ABSTRACT

A circuit board, a display panel and an electronic device. The electronic device includes a housing and a display panel fixed to the housing. The display panel includes a display module and a circuit board, and the display module is electrically connected to the circuit board. The circuit board includes a touch wire and a display protocol wire, and a projection of the touch wire and a projection of the display protocol wire in the thickness direction are not overlapped. The problem of the signal interference resulting from that there is an overlapping part between the touch wire and the display protocol wire in the thickness direction is avoided.

14 Claims, 5 Drawing Sheets

(56) References Cited

FOREIGN PATENT DOCUMENTS

| | | | |
|---|---|---|---|
| CN | 111511100 | A | 8/2020 |
| CN | 113504848 | A | 10/2021 |
| CN | 114428570 | A | 5/2022 |
| CN | 116011385 | A | 4/2023 |
| KR | 20200141782 | A | 12/2020 |

* cited by examiner

CIRCUIT BOARD, DISPLAY PANEL AND ELECTRONIC DEVICE

CROSS-REFERENCE TO RELATED APPLICATIONS

This application is a national stage of international PCT Application No. PCT/CN2024/072684 filed on Jan. 17, 2024, the entire contents of which are incorporated herein by reference.

TECHNICAL FIELD

The present disclosure relates to the field of display technologies, and in particular, to a circuit board, a display panel, and an electronic device.

BACKGROUND

In the existing electronic device, in order to achieve the miniaturization design of the electronic device, the wiring manner of the circuit board of the electronic device is improved. Generally, the circuit board usually includes a touch wire and a display protocol wire, the touch wire is configured to transmit a touch driving signal and a touch sensing signal to the display panel, and the display protocol wire is configured to transmit a video image signal, such as a Mobile Industry Processor Interface (MIPI) signal, to the display panel. However, the touch driving signal, the touch sensing signal and the video image signal are all high-frequency signals, and when the distribution of the touch wire and the display protocol wire is unreasonable, the problem of the interference between the signals transmitted by the two wires may occur, thereby affecting the operation stability of the electronic device.

SUMMARY

An object of the present disclosure is to provide a circuit board, a display panel and an electronic device, which can avoid or alleviate the problem of the interference between the signals transmitted by the touch wire and the display protocol wire.

According to a first aspect of an embodiment of the present disclosure, a circuit board is provided, the circuit board includes a touch wire and a display protocol wire, where a projection of the touch wire and a projection of the display protocol wire in a thickness direction are not overlapped.

Optionally, the circuit board includes a bonding region and a body region, and the bonding region is provided with a protocol terminal;

the circuit board further includes a connector disposed in the body region, and the connector is provided with a protocol port; and one end of the display protocol wire is connected to the protocol port of the connector, and the other end of the display protocol wire is connected to the protocol terminal of the bonding region.

Optionally, a direction of a line connecting the body region and the bonding region is taken as a first direction; the circuit board further includes a touch chip, the touch chip is disposed in the body region, and the touch wire is electrically connected to the touch chip;

the touch wire includes at least two extending segments, each of the at least two extending segments has a component in the first direction, two of the at least two extending segments are spaced apart in a second direction, one end of each of the two of the at least two extending segments is connected, the other end of one of the two of the at least two extending segments is extended to the bonding region, and the other end of the other one of the two of the at least two extending segments is connected to the touch chip; and the second direction is perpendicular to the first direction; both the connector and the display protocol wire are between the two of the at least two extending segments.

Optionally, the connector includes an opening, the protocol port is exposed through the opening, and the display protocol wire is connected to the protocol port through the opening;

the body region includes a connecting surface and a side surface adjacently connected the connecting surface, wherein the connecting surface is used for connecting the bonding region, and when the opening faces the side surface, the display protocol wire surrounds a part of a peripheral side of the connector.

Optionally, the body region is provided with a through fingerprint hole, and the connector, the fingerprint hole and the touch chip are sequentially arranged along the second direction; and a projection position of the fingerprint hole and a projection position of the touch chip in the bonding region in the first direction are respectively at two sides of the protocol terminal along the second direction.

Optionally, a minimum distance between the touch wire and the fingerprint hole is greater than or equal to 0.3 mm.

Optionally, a ground wire is disposed between the touch wire and the fingerprint hole.

Optionally, the ground wire is disposed at a position where distance between the touch wire and the fingerprint hole is less than 0.3 mm between the touch wire and the fingerprint hole; and/or a width of the ground wire is greater than or equal to 0.05 mm.

Optionally, the circuit board further includes a touch chip, and the touch chip is disposed in the body region;

the bonding region is further provided with a touch signal terminal; an end of the touch wire is connected to the touch chip, and the other end of the touch wire is connected to the touch signal terminal of the bonding region; and the touch signal terminal and the protocol terminal are at a same side of the circuit board.

Optionally, a distance between the touch wire and the display protocol wire is less than a distance between the touch signal terminal and the protocol terminal.

Optionally, a minimum distance between the touch wire and the display protocol wire is greater than or equal to 0.3 mm.

Optionally, a ground wire is disposed between the touch wire and the display protocol wire.

Optionally, the ground wire is disposed at a position where a distance between the touch wire and the display protocol wire is less than 0.3 micrometers; and/or a width of the ground wire is greater than or equal to 0.05 mm.

Optionally, the touch wire and the display protocol wire are at a same wiring layer.

According to a second aspect of the embodiments of the present disclosure, provided is a display panel including a display module and the circuit board described above, and the display module is electrically connected to the circuit board.

According to a third aspect of the embodiments of the present disclosure, provided is an electronic device, including a housing and the display panel described above, the display panel is fixed to the housing.

According to the circuit board, the display panel and the electronic device provided by the present disclosure, by controlling the wiring paths of the touch wire and the display protocol wire, the projection of the touch wire and the projection of the display protocol wire in the thickness direction are not overlapped. Therefore, that the touch wire and the display protocol wire are overlapped in the thickness direction is avoided, and then, the problem of the interference of the high-frequency touch signal and the display protocol signal is alleviated. Through the above arrangement, the stability of the touch signal and the display signal can be ensured.

It should be understood that the above general description and the following detailed description are exemplary and explanatory only and are not intended to limit the present disclosure.

BRIEF DESCRIPTION OF DRAWINGS

In order to more clearly illustrate the technical solutions in the embodiments of the present disclosure, the accompanying drawings, which need to be used in the description of the embodiments, are briefly introduced below. Obviously, the accompanying drawings described herein are merely some embodiments in the present disclosure, and for those skilled in the art, other drawings may be obtained according to these drawings without creative efforts.

REFERENCE SIGNS

Electronic Device 1
Display Panel 10
Housing 20
Circuit Board 100
Body Region 110
Fingerprint Hole 111
Bonding Region 120
Connecting Surface 121
Side Surface 122
Touch Signal Terminal 123
Protocol Terminal 124
Touch Wire 200
Extending Segment 210
Connecting Segment 220
Display Protocol Wire 300
Touch Chip 400
Connector 500
Opening 510

Protocol Port 520
Ground Wire 600
Display Module 900
First Direction X
Second Direction Y

DETAILED DESCRIPTION

Exemplary embodiments will be described in detail herein, examples of which are illustrated in the accompanying drawings. When the following descriptions involve the drawings, like numerals in different drawings refer to like or similar elements unless otherwise indicated. The embodiments described in the exemplary examples below are not intended to represent all embodiments consistent with the present disclosure. Rather, they are merely the embodiments of devices and methods consistent with some aspects of the present disclosure as recited in the appended claims.

The terms used in the present disclosure are for the purpose of describing particular embodiments only and are not intended to limit the present disclosure. Unless otherwise defined, technical terms or scientific terms used in the present disclosure shall have their ordinary meanings as understood by those of ordinary skills in the field to which the present disclosure belongs. Similar words such as "a" or "an" do not mean quantity limitation, but mean that there is at least one. "Multiple" means two or more. Similar words such as "include" or "comprise" mean that the elements or objects appear before "include" or "comprise" cover the elements or objects listed after "include" or "comprise" and their equivalents, but do not exclude other elements or objects. Similar words such as "connect" or "couple" are not limited to physical or mechanical connections, and may include electrical connections, whether direct or indirect. Similar words such as "up" and/or "down" are only for convenience of explanation, and are not limited to a position or a spatial orientation. As used in the present disclosure and the appended claims, the singular forms "a", "said" and "the" are intended to include the plural forms as well, unless the context clearly dictates otherwise. It should also be understood that the term "and/or" used herein includes any and all possible combinations of one or more of the associated listed items.

Figure 1:
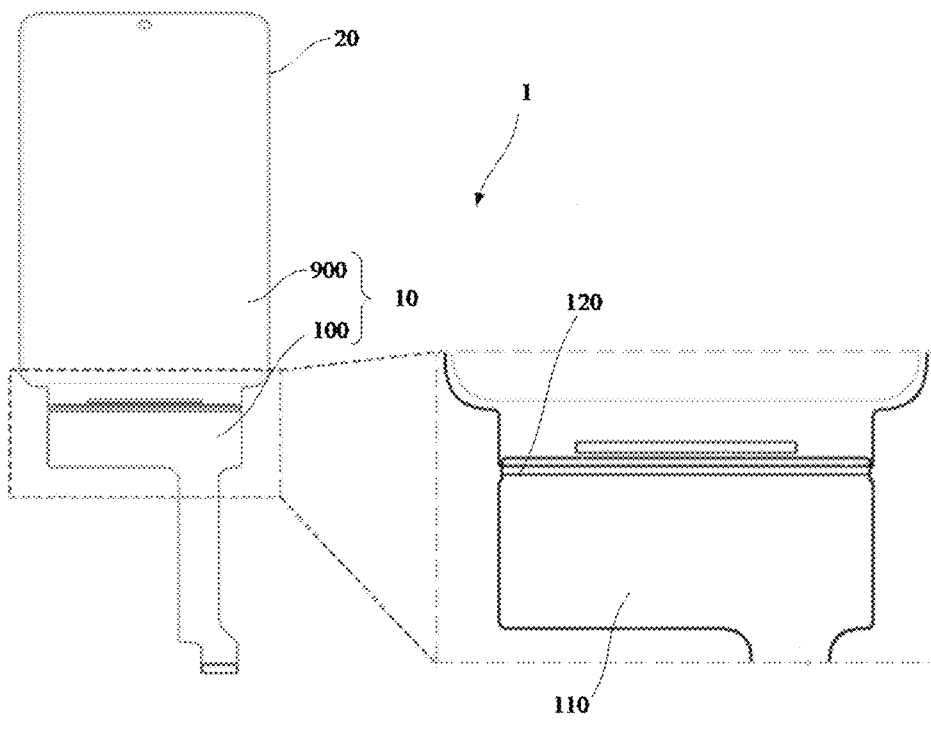
FIG. 1 is a schematic structural diagram of an electronic device according to an embodiment of the present disclosure.

As shown in FIG. 1, according to the present disclosure, an electronic device 1 is provided. The electronic device 1 may be a device with a display panel 10 that allows for an intelligent display, such as a cell phone, a tablet computer, a desktop computer, a watch, and so on. The electronic device 1 includes the display panel 10 and a housing 20, and the display panel 10 is fixed to the housing 20. The display panel 10 specifically includes a display module 900 and a circuit board 100, each of the display module 900 and the circuit board 100 has a bonding region 120, and the bonding region 120 of the display module 900 and the bonding region 120 of the circuit board 100 are bonded through the bonding process, to realize the electrical connection between the display module 900 and the circuit board 100.

A wiring structure of the circuit board 100 is mainly described in detail below with reference to FIGS. 1 to 7.

Figure 2:
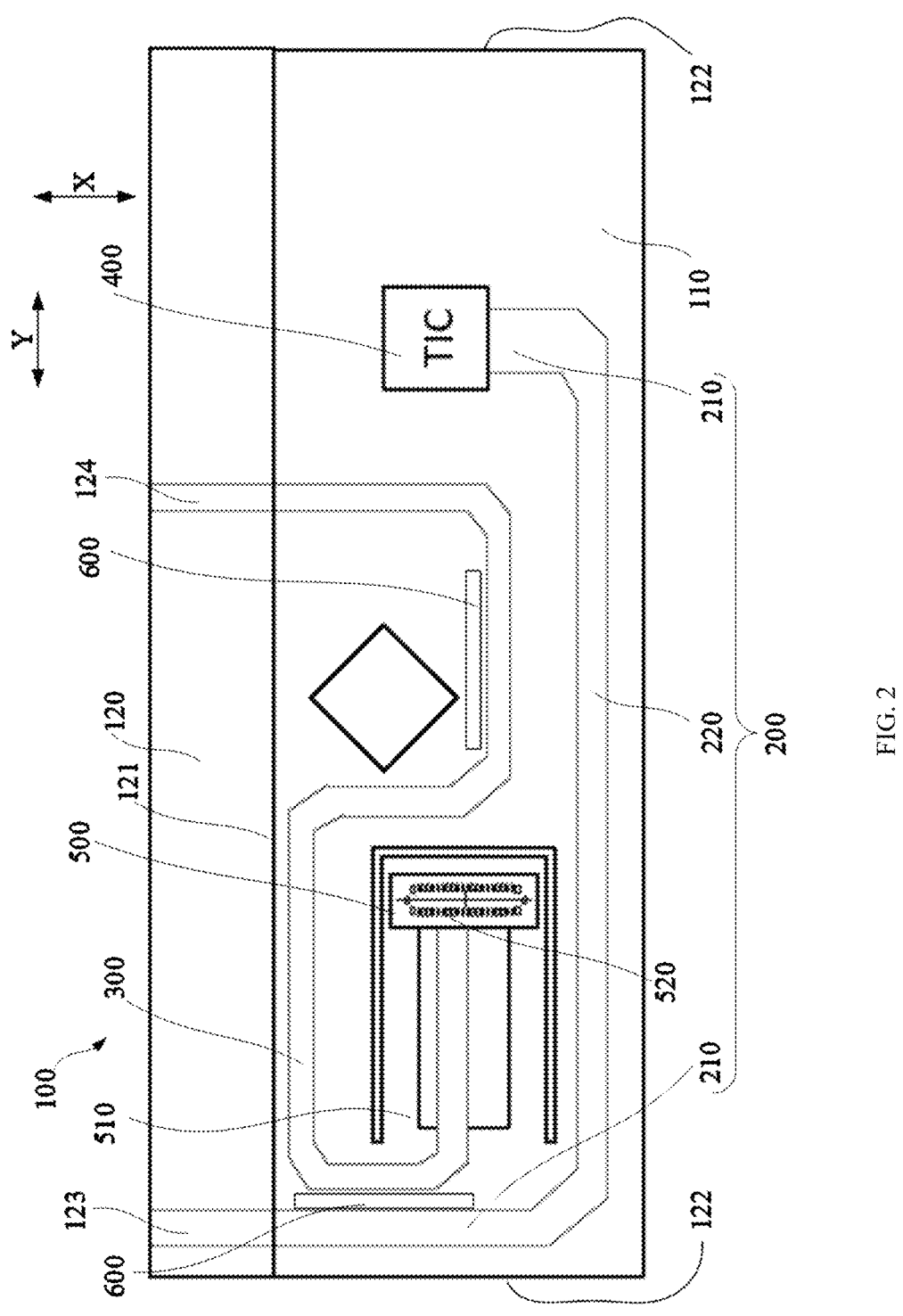
FIG. 2 is a schematic structural diagram of a circuit board in an electronic device according to an embodiment of the present disclosure.

As shown in FIGS. 1 and 2, the circuit board 100 includes a body region 110 and a bonding region 120.

The body region 110 is provided with a wiring structure that specifically includes a touch wire 200 and a display protocol wire 300. The touch wire 200 includes a touch driving line Tx and a touch sensing line Rx, the touch driving line Tx is configured to transmit a touch driving signal, and the touch sensing line Rx is configured to transmit a touch sensing signal. The display protocol wire 300 is configured to transmit a video image signal, such as a Mobile Industry Processor Interface (MIPI) signal, to the display panel 10. The circuit board 100 further includes a touch chip 400 and a connector 500, and the touch chip 400 is disposed in the body region 110. The touch wire 200 is electrically connected to the touch chip 400 to transmit the touch driving signal and/or the touch sensing signal to the touch chip 400, or receive the touch driving signal and/or the touch sensing signal transmitted by the touch chip 400. The connector 500 is provided with a protocol port 520. Specifically, the connector 500 includes an opening 510, the protocol port 520 is exposed through the opening 510, and the display protocol wire 300 is connected to the protocol port 520 of the connector 500 through the opening 510 to receive the video image signal from the connector 500 and transmit the video image signal to the display panel 10.

The bonding region 120 of the circuit board 100 is provided with a touch signal terminal 123 and a protocol terminal 124. The bonding region on the display panel 10 is referred to as a display bonding region, and the display bonding region is provided with a corresponding touch receiving terminal and a protocol receiving terminal. The display bonding region on the display panel 10 and the bonding region 120 on the circuit board 100 are fixedly connected by a bonding process, and the electrical connection between the touch receiving terminal and the touch signal terminal 123, and the electrical connection between the protocol receiving terminal and the protocol terminal 124 are achieved. One end of the touch wire 200 in the body region 110 on the circuit board 100 extends to the touch signal terminal 123 in the bonding region 120, and is electrically connected to the touch signal terminal 123, and the other end of the touch wire 200 is electrically connected to the touch chip 400, and is configured to transmit the touch signal (the touch driving signal and/or the touch sensing signal) sent by the touch chip 400 to the display panel 10, or transmit the touch signal (the touch driving signal and/or the touch sensing signal) sent by the display panel 10 to the touch chip 400. One end of the display protocol wire 300 in the body region 110 on the circuit board 100 extends to the protocol terminal 124 in the bonding region 120, and is electrically connected to the protocol terminal 124, and the other end of the display protocol wire 300 is electrically connected to the connector 500, and is configured to transmit the video image signal sent by the receiving connector 500 to the display panel 10.

It should be noted that, in this embodiment, the touch wire 200 and the display protocol wire 300 are only in a wiring region, and the touch signal terminal 123 and the protocol terminal 124 correspondingly connected to the touch wire 200 and the display protocol wire 300 are disposed in the bonding region 120. Of course, in other embodiments, the touch wire 200 and the display protocol wire 300 may extend into the bonding region 120, and a part of the structure of the touch wire 200 and a part of the structure of the display protocol wire 300 in the bonding region 120 may be directly used as the touch signal terminal 123 and the protocol terminal 124.

Optionally, the touch signal terminal 123 and the protocol terminal 124 are at the same side of the circuit board. In other words, the touch wire 200 and the display protocol wire 300 are led out from the same side of the circuit board. That is, the bonding regions 120 are respectively provided with the touch signal terminal 123 and the protocol terminal 124 correspondingly connected to the touch wire 200 and the display protocol wire 300, so that this design can simplify the bonding process, avoid the increase of number of times for performing the bonding process resulting from that the touch wire 200 and the display protocol wire 300 are led out from the different sides of the circuit board, and avoid too many bonding regions occupying a larger space.

Optionally, a distance between the touch wire 200 and the display protocol wire 300 is smaller than a distance between the touch signal terminal 123 and the protocol terminal 124, which is more convenient for performing the bonding process.

Figure 3:
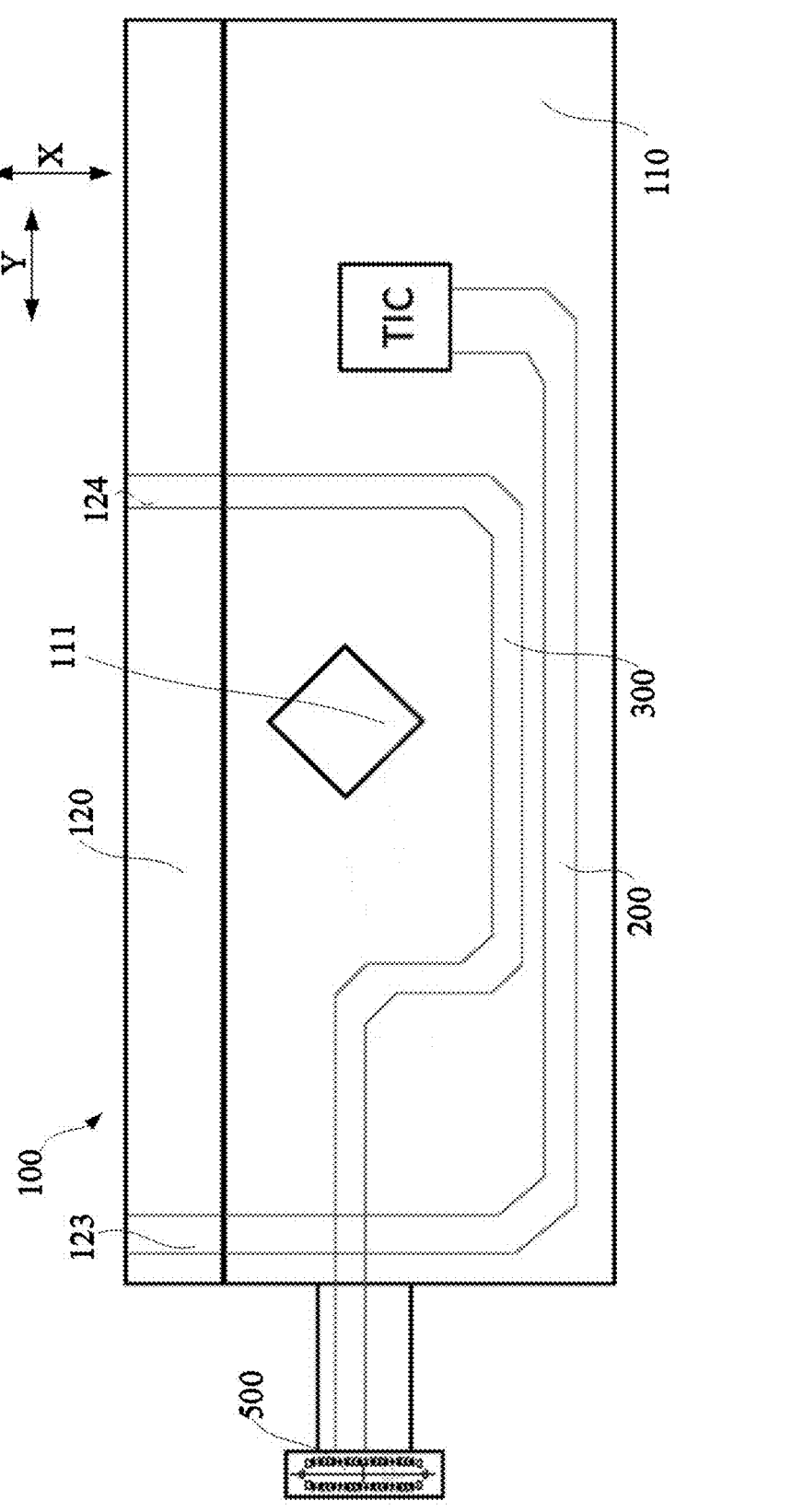
FIG. 3 is a schematic structural diagram of a circuit board.

As shown in FIG. 3, in one design, in order to reduce the area occupied by the circuit board 100 along the thickness direction, the circuit board 100 is provided with a multi-layer structure (for example, a 6-layer structure), and the touch wire 200 and the display protocol wire 300 are disposed on different wiring layers. However, disposing the touch wire 200 and the display protocol wire 300 on different wiring layers generally results in the overlapping part between the projection of the touch wire 200 and the projection of the display protocol wire 300 in the thickness direction. Since the touch driving signals, the touch sensing signal and the video image signal respectively transmitted by the touch wire 200 and the display protocol wire 300 are high frequency signals, when the projection of the touch wire 200 and the projection of the display protocol wire 300 are partially overlapped in the thickness direction, the signals transmitted by the two wires may interfere with each other, thereby affecting the operation stability of the electronic device 1.

As shown in FIG. 2 and FIGS. 4-6, in conjunction with FIG. 1 if necessary. In the present disclosure, there is no overlapping part between the projection of the touch wire 200 and the projection of the display protocol wire 300 in the thickness direction. In the above structure, by controlling the wiring paths of the touch wire 200 and the display protocol wire 300, there is no overlapping part between the projection of the touch wire 200 and the projection of the display protocol wire 300 in the thickness direction, thereby preventing the touch wire 200 and the display protocol wire 300 from overlapping in the thickness direction, thereby alleviating the problem of interference between the high-frequency touch signal and the display protocol signal. Through the above arrangement, the stability of the touch signal and the display signal during transmission can be ensured, thereby ensuring the stability of the operation of the electronic device 1.

Optionally, as shown in FIGS. 2 and 4-6, the connector 500 is disposed in the body region 110, so that all structures of the display protocol wire 300 may be disposed in the body region 110 of the circuit board 100. Through the above arrangement, the external of the connector 500 is avoided, the area occupied by the connector 500 and the circuit board 100 as a whole can be reduced, thereby facilitating the miniaturization setup of the whole structure and providing more selection for the overall design of the electronic device 1. At the same time, the built-in design of the connector 500 can avoid providing a separate supporting structure for the connector 500 and avoid the structure by which the display protocol wire 300 extends outwards to the outside of the circuit board 100, thereby ensuring the stability of the structure while reducing the cost.

Optionally, the built-in design of the connector 500 enables the connector 500 to be located between the touch chip 400 and the touch signal terminal 123 corresponding to the touch chip 400, and enables that the occupied position of the connector 500 (that is, the width of the connector 500)

limited by the touch wire 200 is less than the distance from the touch chip 400 to the touch signal terminal 123 corresponding to the touch chip 400, which facilitates a miniaturized setup of the overall structure of the board.

The direction of a line connecting the body region 110 and the bonding region 120 is taken as the first direction X, then the second direction Y is set, and the second direction Y is perpendicular to the first direction X and the thickness direction respectively. The touch wire 200 includes a connecting segment 220 and at least two extending segments 210. Each of the at least two extending segments 210 has a component in a first direction X, and two extending segments 210 are spaced apart along the second direction Y, one end of each of the two extending segments 210 is electrically connected through the connecting segment 220, the other end of one extending segment 210 extends to the bonding region 120, and the other end of the other extending segment 210 is connected to the touch chip 400. Through the above structure, one end of the touch wire 200 is connected to the touch chip 400, and the other end of the touch wire 200 is connected to the touch signal terminal 123 in the bonding region 120. In the embodiment shown in FIGS. 2 and 4, the touch wire 200 presents a U-shaped structure in the body region 110. Of course, in other embodiments, the connecting segment 220 may not be provided separately. Since the touch chip 400 and the touch signal terminal 123 are spaced apart in the second direction Y, the two extending segments 210 are obliquely disposed, that is, there are components in both the first direction X and the second direction Y. One end of each of the two extending segments 210 is fixedly connected, the other end of each of the two extending segments 210 is separated, the other end of one extending segment 210 is connected to the touch signal terminal 123 in the bonding region 120, and the other end of the other extending segments 210 is connected to the touch chip 400. At this time, the touch wire 200 presents a V-like structure in the body region 110. Both the connector 500 and the display protocol wire 300 are between the two extending segments 210.

In the above arrangement, the position of the touch wire 200 in the circuit board 100 is adopted in accordance with the prior art to reduce the manufacturing cost. Meanwhile, to match the position of the touch wire 200, the connector 500 and the display protocol wire 300 are disposed in the space enclosed by the touch wire 200, to properly lay out the connector 500 and the touch wire 200.

Optionally, the touch wire 200 and the display protocol wire 300 are at the same wiring layer. Through the above arrangement, the touch wire 200 and the display protocol wire 300 can be disposed in the same wiring layer, so that the thickness of the circuit board 100 can be reasonably reduced, and the cost can be reduced. In this embodiment, the circuit board 100 may be a two-layer structure. Of course, in other embodiments, the circuit board 100 may also be a structure with three or more layers.

Optionally, the body region 110 is provided with a through fingerprint hole 111, and after the circuit board 100 and the display panel 10 are fixedly connected, the region for fingerprint identification in the display panel 10 corresponds to the position of the fingerprint hole 111 in the body region 110 of the circuit board 100 in the thickness direction. In the circuit board 100 structure, the touch signal terminal 123 is at the left side of the body region 110, and the protocol terminal 124 is at the right side of the body region 110. Meanwhile, with respect to the protocol terminal 124, the touch chip 400 is away from the touch signal terminal 123. Since the fingerprint hole 111 is in the central position of the body region 110, when the circuit board 100 has fewer wiring layers, especially only two layers, the touch chip 400 and the connector 500 are in the same layer structure. In this case, to improve the space utilization rate, the connector 500 may be disposed at a side of the fingerprint hole 111 away from the touch chip 400. In other words, the connector 500, the fingerprint hole 111 and the touch chip 400 are sequentially arranged along the second direction Y, and the projection position of the fingerprint hole 111 and the projection position of the touch chip 400 in the bonding region 120 along the first direction X are respectively at two sides of the protocol terminal 124 along the second direction Y. The connector 500 is between the fingerprint hole 111 and the extending segment 210 at the left side. With the above arrangement, the inherent design of the circuit board 100 is adopted to the greatest extent, and a proper placement position for the connector 500 is provided in the structure of the circuit board 100 with the fingerprint hole 111 at the center.

Figure 4:
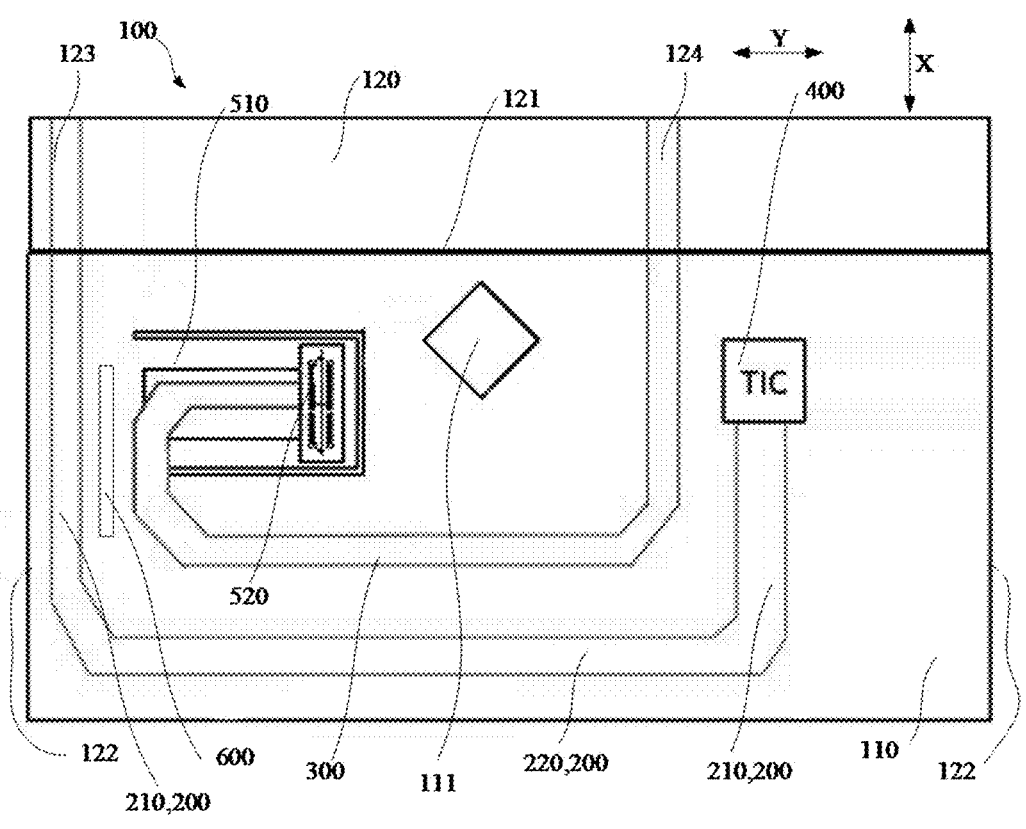
FIG. 4 is a schematic structural diagram of a circuit board in an electronic device according to another embodiment of the present disclosure.

As shown in FIGS. 3 and 4, when the position of the connector 500 is fixed, that is, when the connector 500 is between the fingerprint hole 111 and the extending segment 210 at the left side, one end of the display protocol wire 300 for connecting the bonding region 120 is in a region between the fingerprint hole 111 and the touch chip 400, thereby resulting in that at least a part of the structure of the display protocol wire 300 bypasses the periphery of the fingerprint hole 111. When the minimum distance between the touch wire 200 and the fingerprint hole 111 is greater than or equal to 0.3 mm, the fingerprint hole 111 may be prevented from interfering with the video image signal transmitted by the display protocol wire 300, and the interference between the light signal and the video image signal may be avoided when the light signal is transmitted in the fingerprint hole 111. Alternatively, in other embodiments, the minimum distance between the display protocol wire 300 and the fingerprint hole 111 may be set to be less than 0.3 mm. In this case, to avoid signal interference, a ground wire 600 needs to be disposed at a position where the distance between the touch wire 200 and the fingerprint hole 111 is less than 0.3 um, and the width of the ground wire 600 is greater than or equal to 0.05 mm, thereby effectively avoiding signal interference. In this embodiment, the width of the ground wire 600 is 0.1 mm. Of course, the ground wire 600 may also be disposed at a position where the distance between the touch wire 200 and the fingerprint hole 111 is greater than or equal to 0.3 um, to better avoid the problem of the signal interference and ensure the stable transmission of the touch signal and the video image signal.

Optionally, as shown in FIG. 2, a ground wire 600 is disposed between the display protocol wire 300 and the fingerprint hole 111, and the positions corresponding to at least 3 edges or 3 vertexes of the fingerprint hole 111 are respectively provided with a ground wire 600, for example, the bending direction of the ground wire 600 and the bending direction of the display protocol wire 300 are approximately identical, to better avoid the problem of the signal interference, and ensure the stable transmission of the touch signal and the video image signal.

Similarly, when the distance between the touch wire 200 and the display protocol wire 300 is too close, a problem of interference between the touch signal and the video image signal may be present. In some embodiments, the minimum distance between the touch wire 200 and the display protocol wire 300 is greater than or equal to 0.3 mm, to alleviate the problem of the interference between the touch signal and the video image signal resulting from the too close distance between the touch wire 200 and the display protocol wire 300. In some other embodiments, when a minimum distance between the touch wire 200 and the display protocol wire 300 is less than 0.3 mm, a ground wire 600 is disposed at a position where the distance between the touch wire 200 and the display protocol wire 300 is less than 0.3 mm, and the width of the ground wire 600 is greater than or equal to 0.05 mm. In this embodiment, the width of the ground wire 600 is 0.1 mm. Of course, the ground wire 600 may also be disposed at a position where the distance between the touch wire 200 and the display protocol wire 300 is greater than or equal to 0.3 mm, to better avoid the signal interference and ensure the stable transmission of the touch signal and the video image signal.

Optionally, a ground wire 600 is disposed between the touch wire 200 and the display protocol wire 300. For an region with a small distance between the touch wire 200 and the display protocol wire 300 (for example, a region with a distance between the touch wire 200 and the display protocol wire 300 is less than 0.3 mm), the length of an ortho-graphic projection of the ground wire 600 in this region on the touch wire 200 is greater than a length of an orthographic projection of the display protocol wire 300 in this region on the touch wire 200, to better avoid the problem of the signal interference, and ensure the stable transmission of the touch signal and the video image signal.

Optionally, a ground wire 600 is disposed between the opening 510 of the connector 500 and the touch wire 200, and at least two sides of the opening 510 of the connector 500 are provided with the ground wire 600. For example, a side of the opening 510 of the connector 500 in FIG. 2 close to the side surface 122 of the body region 110 and a side of the opening 510 of the connector 500 close to the connecting segment 220 of the touch wire 200 are respectively provided with the ground wire 600, to better shield the possible signal interference of the display protocol wire 300 starting from the connector 500, and ensure the stable transmission of the touch signal and the video image signal.

Figure 5:
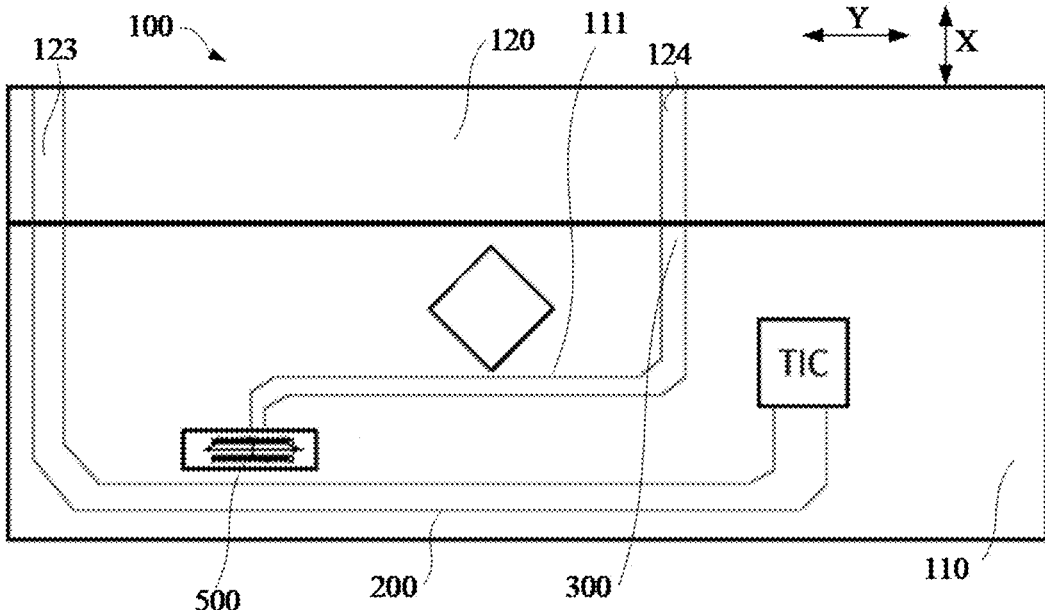
FIG. 5 is a schematic structural diagram of a circuit board in an electronic device according to still another embodiment of the present disclosure.
Figures 6, 7:
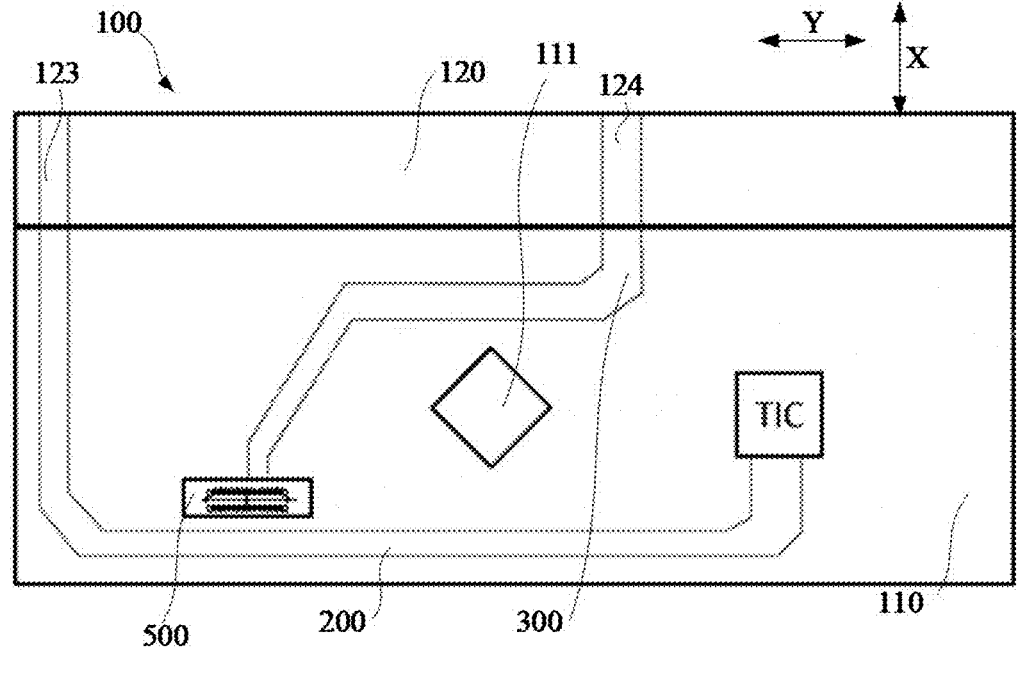
FIG. 6 is a schematic structural diagram of a circuit board in an electronic device according to still another embodiment of the present disclosure.
FIG. 7 is a schematic cross-sectional view of a circuit board in an electronic device according to another embodiment of the present disclosure.

As shown in FIGS. 2 and 4-6, the connector 500 is placed in a rich manner. For example, in the embodiment shown in FIGS. 2 and 4, the body region 110 includes a connecting surface 121 and a side surface 122 adjacent to the connecting surface 121, where the connecting surface 121 is used for connecting the bonding region 120. When the opening 510 faces the side surface 122, the display protocol wire 300 surrounds a part of the structure at the peripheral of the connector 500. Specifically, the opening 510 may face the side surface 122 of the body region 110 away from the touch chip 400. As shown in FIG. 2, the display protocol wire 300 surrounds a side of the connector 500 close to the bonding region 120 and loops around a side of the fingerprint hole 111 away from the bonding region 120, and finally loops around the side surface of the fingerprint hole 111 away from the opening 510 to the connecting surface 121 and extends to the protocol terminal 124 in the bonding region 120. Alternatively, as shown in FIG. 4, the display protocol wire 300 surrounds a side of the connector 500 away from the bonding region 120 and extends to a side of the fingerprint hole 111 away from the bonding region 120, and finally surrounds the side surface of the fingerprint hole 111 away from the opening 510 to the connecting surface 121 and extends to the protocol terminal 124 of the bonding region 120. Of course, in other embodiments, as shown in FIGS. 5 to 7, the opening 510 may also face to the side surface 122 of the body region 110 close to the touch chip 400. In the illustrated embodiment, the opening 510 may also face the front side of the circuit board 100.

In the present disclosure, the structural embodiments and the method embodiments may complement each other with-out conflict.

In the present disclosure, the terms "first" and "second" are used for description purposes only, and can't be under-stood as indicating or implying relative importance. The terms "a plurality of" and "several" refer to two or more unless specifically defined otherwise.

Other embodiments of the present disclosure will be readily apparent to those skilled in the art upon consider-ation of this description and practicing the disclosure dis-closed herein. The present disclosure is intended to cover any variations, uses, or adaptations of this disclosure which follow the general principles of the present disclosure and include common knowledge or customary technical means in this technical field that are not disclosed in the present disclosure. The specification and embodiments are consid-ered as exemplary only, and the true scope and the spirit of the present disclosure is indicated by the following claims.

It should be understood that the present disclosure is not limited to the precise structure already described above and shown in the drawings, and that various modifications and changes may be made without departing from the scope thereof. The scope of the present disclosure is limited only by the appended claims.

The invention claimed is:

1. A circuit board, comprising a touch wire and a display protocol wire, wherein a projection of the touch wire and a projection of the display protocol wire in a thickness direc-tion are not overlapped;
   wherein the circuit board comprises a bonding region and a body region, and the bonding region is provided with a protocol terminal;
   the circuit board further comprises a connector disposed in the body region, and the connector is provided with a protocol port; and
   one end of the display protocol wire is connected to the protocol port of the connector, and the other end of the display protocol wire is connected to the protocol terminal of the bonding region;
   wherein a direction of a line connecting the body region and the bonding region is taken as a first direction; the circuit board further comprises a touch chip disposed in the body region, and the touch wire is electrically connected to the touch chip;
   the touch wire comprises at least two extending segments, each of the at least two extending segments has a component in the first direction, two of the at least two extending segments are spaced apart in a second direc-tion, one end of each of the two of the at least two extending segments is connected, the other end of one of the two of the at least two extending segments is extended to the bonding region, and the other end of the other one of the two of the at least two extending segments is connected to the touch chip; and
   the second direction is perpendicular to the first direction; along the second direction, both the connector and the display protocol wire are between the two of the at least two extending segments; and
   the display protocol wire at least surrounds a part of a peripheral side of the connector along the second direction.

2. The circuit board according to claim 1, wherein the connector comprises an opening, the protocol port is exposed through the opening, and the display protocol wire is connected to the protocol port through the opening;

the body region comprises a connecting surface and a side surface adjacently connected the connecting surface, wherein the connecting surface is used for connecting the bonding region.

3. The circuit board according to claim 1, wherein the body region is provided with a through fingerprint hole, and the connector, the fingerprint hole and the touch chip are sequentially arranged along the second direction; a projection position of the fingerprint hole and a projection position of the touch chip, in the bonding region along the first direction, are respectively at two sides of the protocol terminal along the second direction.

4. The circuit board according to claim 3, wherein a minimum distance between the touch wire and the fingerprint hole is greater than or equal to 0.3 mm.

5. The circuit board according to claim 3, wherein a ground wire is disposed between the touch wire and the fingerprint hole.

6. The circuit board according to claim 5, wherein the ground wire is disposed at a position where a distance between the touch wire and the fingerprint hole is less than 0.3 mm; and/or a width of the ground wire is greater than or equal to 0.05 mm.

7. The circuit board according to claim 1, wherein the circuit board further comprises a touch chip, and the touch chip is disposed in the body region;

the bonding region is further provided with a touch signal terminal; an end of the touch wire is connected to the touch chip, and the other end of the touch wire is connected to the touch signal terminal of the bonding region; and the touch signal terminal and the protocol terminal are at a same side of the circuit board.

8. The circuit board according to claim 7, wherein a distance between the touch wire and the display protocol wire is smaller than a distance between the touch signal terminal and the protocol terminal.

9. The circuit board according to claim 1, wherein a minimum distance between the touch wire and the display protocol wire is greater than or equal to 0.3 mm.

10. The circuit board according to claim 1, wherein a ground wire is disposed between the touch wire and the display protocol wire.

11. The circuit board according to claim 10, wherein the ground wire is disposed at a position where a distance between the touch wire and the display protocol wire is less than 0.3 um; and/or a width of the ground wire is greater than or equal to 0.05 mm.

12. The circuit board according to claim 1, wherein the touch wire and the display protocol wire are at a same wiring layer.

13. A display panel, comprising a display module and the circuit board according to claim 1, wherein the display module is electrically connected to the circuit board.

14. An electronic device, comprising a housing and the display panel according to claim 13, wherein the display panel is fixed to the housing.

\* \* \* \* \*